March 5, 1963 H. G. CRAMER 3,080,130
FILM PROCESSING REEL
Filed Oct. 17, 1958 2 Sheets-Sheet 1
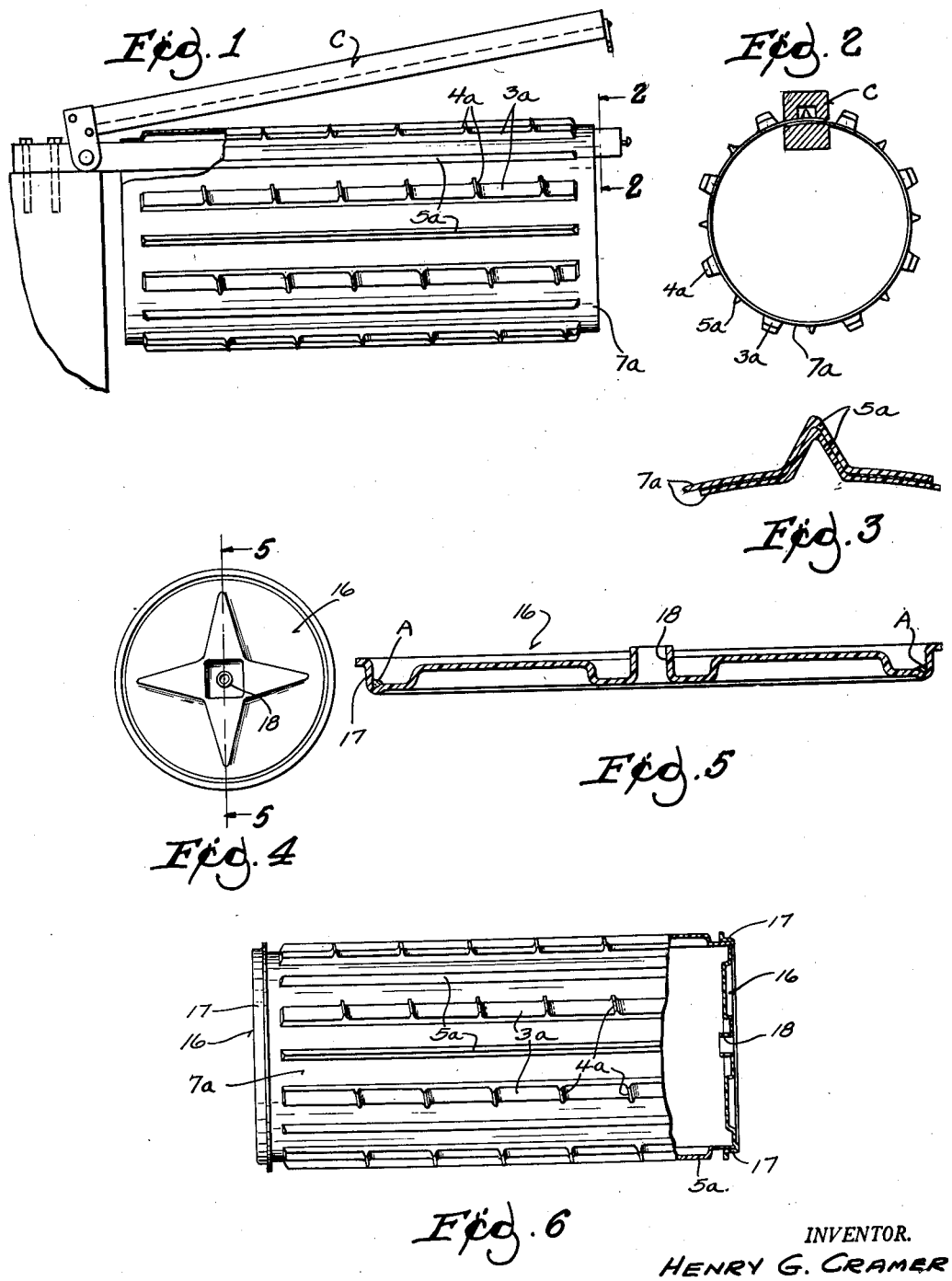
INVENTOR.
HENRY G. CRAMER
BY
Lieber, Lieber & Nilles
ATTORNEYS March 5, 1963 H. G. CRAMER 3,080,130
FILM PROCESSING REEL
Filed Oct. 17, 1958 2 Sheets-Sheet 2
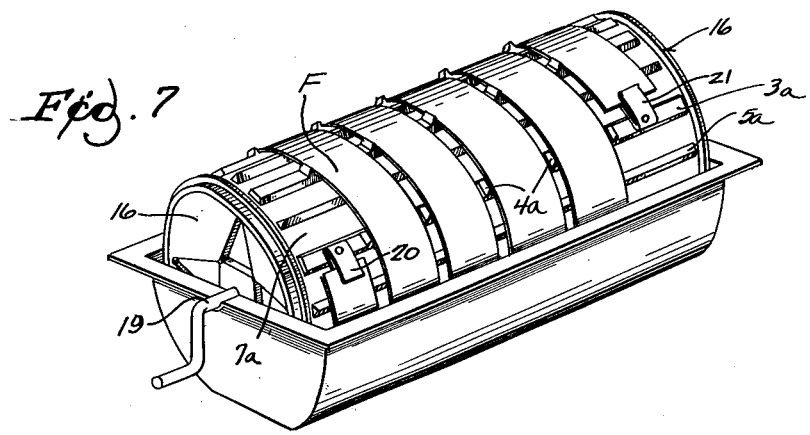
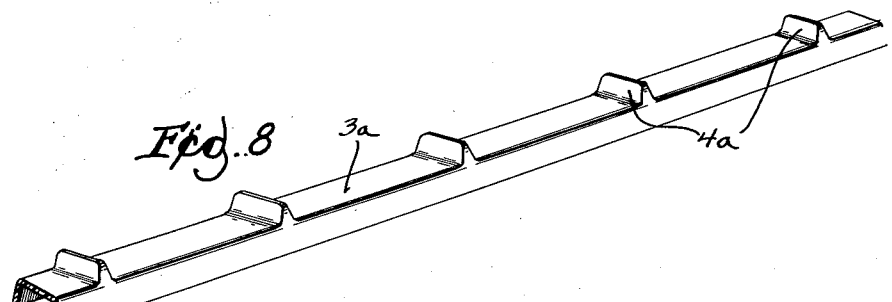
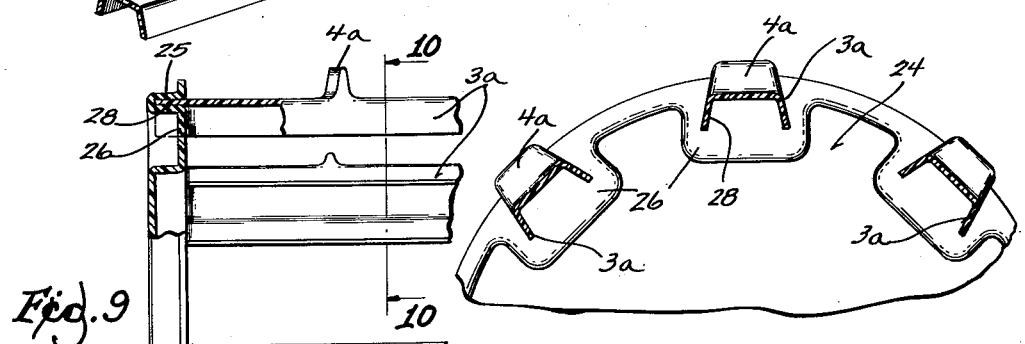
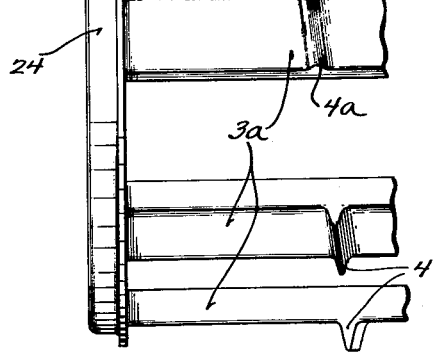
INVENTOR.
HENRY G. CRAMER
BY
Lieber, Lieber & Nilles
ATTORNEYS United States Patent Office 3,080,130
Patented Mar. 5, 1963

3,080,130
FILM PROCESSING REEL
Henry G. Cramer, Milwaukee, Wis., assignor to Miisco Manufacturing Company, Milwaukee, Wis., a corporation of Wisconsin
Filed Oct. 17, 1958, Ser. No. 767,859
4 Claims. (Cl. 242—77.1)

This invention relates to a rotatable reel for holding a strip of film in an even spiral during processing of the film in a tank of processing fluid.

Reels of this general nature must hold the film in such a manner to permit good circulation of the processing fluid past the entire surface of the film. It is also important that these reels are easy to load in the dark. Furthermore, these reels must hold the film in such a manner to prevent entanglement or overlap of the film when the latter stretches upon becoming wet.

Accordingly, the present invention provides an improved reel having the above-desirable characteristics and fulfilling the above functions.

It is generally an object of this invention to provide a reel of the above type which is economical to manufacture, and particularly strong and rigid for its relatively light weight.

Another aspect of the invention contemplates a reel of the above type in which the sheet of formed material is rolled into a cylinder and provided with end supports to thus form the reel.

These and other objects and advantages of the present invention will appear later as this disclosure progresses, reference being had to the accompanying drawings, in which;

FIGURE 1 is a view of the reel forming the subject matter of the present invention with the clamp open;

FIGURE 2 is a sectional view taken on line 2—2 of FIGURE 1 but showing the clamp in the sealing position;

FIGURE 3 is an enlarged, fragmentary sectional view of the sealed joint shown in FIGURE 2;

FIGURE 4 is an elevational view of an end disc for the cylinder;

FIGURE 5 is a sectional view taken on line 5—5 of FIGURE 4, but on an enlarged scale;

FIGURE 6 is a view of the completed reel, partially broken away and in section;

FIGURE 7 is a perspective view of a completed reel having a strip of film wrapped therearound and when in use in a tank of processing fluid;

FIGURE 8 is an enlarged perspective view of a guide projection bar useable in a modified version of the reel;

FIGURE 9 is an enlarged view of an end of a modified form of reel utilizing the bars of FIGURE 8, parts being broken away and in section; and FIGURE 10 is a sectional view taken generally from line 10—10 in FIGURE 9.

The reel may be fabricated in any suitable manner as by suction molding or the like, the drum or supporting member for the film being first formed as a flat sheet of desired size having its edges trimmed as required.

The finished sheet includes the ribs 3a and 5a which are generally generally coextensive in height. The ribs 3a are generally of channel shape and include the guide projections 4a spaced in accordance with the width of the strip film to be processed. The ribs 5a are generally of triangular shape in cross-section and have a rounded or smooth top edge.

The finished sheet may then be rolled into a cylinder and the ribs 5a on the ends of the sheet form interengaging means which are registerable with one another for purposes that will appear later. These ribs have their adjacent surfaces provided with an adhesive and are then clamped together for a period of time in the clamp means C.

As an alternative, the sheet may be cut into bars or rib sections as shown more particularly in FIGURE 8, the bars or ribs 3a then being secureable in annular spaced series to suitable end heads or support members 24, as shown in FIGURE 9, as will hereinafter more fully appear.

It will be noted that the axial spacing of guide projections 4a on one rib 3a relative to the adjacent ribs 3a, is such to produce a spiral path between the projections around the cylinder. The registering end ribs insure correct assembly of the cylinder and proper alinement of the projections 4a to define a continuous spiral path around the reel.

End members in the form of plates or discs 16 are also formed from similar thermoplastic material and each includes an axial flange 17 around its periphery and a hub 18 for receiving a shaft 19 (FIG. 7).

An adhesive A is applied to the inner portion of flanges 17 of the discs and a disc is then inserted on each end of the cylinder, as shown in FIGURE 14, to form a completed reel.

In the reel so formed, a strip of film F is easily wound around the reel, being first clamped at one end to the reel by any suitable clamp 20, then wound around in the spiral path defined by the projections 4a, and then clamped at its other end by a clamp 21. This reel, with its projections 4a, is effective in securely holding the film in position even after it becomes wet and consequently lengthens, to thereby insure that the film does not overlap itself during processing.

The ribs 5a act to hold the film in spaced relation from the main body 7a of the reel so as to insure good circulation of fluid past the film.

The channel-shaped ribs 3a and 5a materially contribute to the strength and rigidity of the reel which is particularly strong considering both its light weight and the material from which it is made.

A modified form of the invention is shown in FIGURES 8–10 inclusive. This reel is fabricated from bars which include the channel-shaped ribs 3a and which have been cut from a sheet such as used to form the cylindrical body 7a shown in FIGS. 1, 2, 6 and 7. The end support members 24 of this embodiment each have an axially extending peripheral flange 25 and furthermore include inwardly spaced boss portions 26 which together with the flange 25 define a generally U-shaped slot or peripheral groove 28 into which the end of the channel ribs 3a are inserted and cemented in place.

With this construction, a relatively open cylinder is formed which does not have the intermediate supporting ribs 5a, nor are these additional ribs necessary because of the open area between the ribs 3a. However, in this modification also, as the ribs 3a are formed from the same sheet as the cylindrical body 7a, the projections 4a are in such alinement to define a spiral path around the finished reel.

Various modes of carrying out the invention are contemplated as being within the scope of the following claims particularly pointing out and distinctly claiming the subject matter which is regarded as the invention.

I claim:
1. A cylindrical film processing reel of thermoplastic material comprising, a pair of axially spaced end members having means for rotatably supporting said reel, a cylinder secured between said members, and a plurality of generally channel-shaped bars formed integrally on said cylinder at spaced circumferential locations, said bars having integrally formed guide projections extending outwardly therefrom and defining a spiral path around said reel.

2. A cylindrical film processing reel of thermoplastic material comprising, a pair of axially spaced end members having means for rotatably supporting said reel, said end members each having an annular flange, a cylinder secured between said flanges, a plurality of generally channel-shaped bars formed integrally on said cylinder and circumferentially spaced therearound, said bars having integrally formed guide projections extending outwardly therefrom and defining a spiral path around said reel, and film supporting ribs integrally formed on said cylinder and located between said first named ribs.

3. A cylindrical film processing reel of thermoplastic material comprising, a pair of axially spaced end members having means for rotatably supporting said reel, a cylinder secured between said members, and a plurality of generally channel-shaped ribs formed integral with said cylinder between the opposite ends thereof and at spaced circumferential locations thereon, said ribs having integrally formed guide projections radiating therefrom and cooperating to define a separate path around said reel.

4. A cylindrical film processing reel comprising, a pair of axially spaced disk-like end members having means for rotatably supporting said reel, said end members having axially extending peripheral flanges and boss portions spaced inwardly from said flanges to provide a plurality of opposite peripheral U-shaped grooves, and a plurality of generally channel-shaped bars circumferentially spaced around said end members and having their end portions extending into said peripheral grooves and secured to said flanges within said grooves, said bars having integrally formed guide projections extending outwardly therefrom and defining a spiral path around said reel.

References Cited in the file of this patent
UNITED STATES PATENTS

| | | |
|---|---|---|
| 137,672 | Garsed | Apr. 8, 1873 |
| 609,677 | Johnston | Aug. 23, 1898 |
| 1,240,954 | Delmas | Sept. 25, 1917 |
| 1,352,418 | Boyer | Sept. 7, 1920 |
| 1,411,098 | Horton | Mar. 28, 1922 |
| 1,885,951 | Salisbury | Nov. 1, 1932 |
| 1,979,106 | Henderson | Oct. 30, 1934 |
| 2,297,208 | Fallscheer | Sept. 29, 1942 |
| 2,487,067 | Morey | Nov. 8, 1949 |
| 2,493,439 | Braund | Jan. 3, 1950 |
| 2,670,501 | Michiels | Mar. 2, 1954 |